US010976952B2

(12) United States Patent
Chopra et al.

(10) Patent No.: US 10,976,952 B2
(45) Date of Patent: Apr. 13, 2021

(54) SYSTEM AND METHOD FOR ORCHESTRATED APPLICATION PROTECTION

(71) Applicant: EMC IP Holding Company LLC, Hopkinton, MA (US)

(72) Inventors: Shelesh Chopra, Bangalore (IN); Kwangyoung Jung, Mississauga (CA); Scott Randolph Quesnelle, Burlington (CA); Ban Wang, Burlington (CA); Sanjeev Kumar Lohchab, Bangalore (IN); Sreelatha Pobbathi, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 153 days.

(21) Appl. No.: 16/028,711

(22) Filed: Jul. 6, 2018

(65) Prior Publication Data
US 2020/0012433 A1    Jan. 9, 2020

(51) Int. Cl.
*G06F 3/06* (2006.01)

(52) U.S. Cl.
CPC .............. *G06F 3/065* (2013.01); *G06F 3/067* (2013.01); *G06F 3/0619* (2013.01)

(58) Field of Classification Search
CPC ......... G06F 3/065; G06F 3/0619; G06F 3/067
See application file for complete search history.

(56) References Cited

U.S. PATENT DOCUMENTS

| 9,003,141 | B2 * | 4/2015 | Nielsen ............... G06F 11/1438 711/162 |
| 9,632,874 | B2 * | 4/2017 | Pawar .................. G06F 16/128 |
| 9,934,099 | B1 * | 4/2018 | Sharma ............... G06F 11/1458 |
| 9,977,704 | B1 | 5/2018 | Chopra et al. |
| 10,268,551 | B1 * | 4/2019 | Wong .................. G06F 11/1456 |
| 10,324,807 | B1 * | 6/2019 | Kumar ................ G06F 11/1435 |
| 2010/0306486 | A1 * | 12/2010 | Balasubramanian ....................... G06F 11/1458 711/162 |
| 2015/0278219 | A1 * | 10/2015 | Phipps .................. G06F 16/951 707/711 |
| 2015/0324255 | A1 * | 11/2015 | Kochunni ........... G06F 11/1448 711/162 |
| 2018/0267861 | A1 * | 9/2018 | Iyer ....................... G06F 3/0619 |

* cited by examiner

*Primary Examiner* — Ramon A. Mercado
(74) *Attorney, Agent, or Firm* — Chamberlain, Hrdlicka, White, Williams & Aughtry

(57) ABSTRACT

A remote agent for providing backup services to applications includes a persistent storage and a backup manager. The persistent storage stores backup policies for the applications. The backup manager identifies an application of the applications for providing the backup services; generates an application backup template based on a backup policy of the backup policies for the application; sends the generated application backup template to a production host that hosts the application; and makes a determination that the backup policy has been triggered. In response to the determination, the backup manager initiates a native data extraction from the application using the application backup template to obtain a native data dump; stores the native data dump in backup storage; and indexes the stored native data dump as a backup.

16 Claims, 10 Drawing Sheets

… (1)

SYSTEM AND METHOD FOR ORCHESTRATED APPLICATION PROTECTION

BACKGROUND

Computing devices generate, use, and store data. The data may be, for example, images, documents, webpages, or meta-data associated with the data. The data may be stored on a persistent storage. Stored data may be deleted from the persistent storage.

A backup of the data stored on a computing device may be backed up by storing it on a second computing device. The second computing device may be geographically separated from the computing device.

SUMMARY

In one aspect, a remote agent for providing backup services to applications in accordance with one or more embodiments of the invention includes a persistent storage and a backup manager. The persistent storage stores backup policies for the applications. The backup manager identifies an application of the applications for providing the backup services; generates an application backup template based on a backup policy of the backup policies for the application; sends the generated application backup template to a production host that hosts the application; and makes a determination that the backup policy has been triggered. In response to the determination, the backup manager initiates a native data extraction from the application using the application backup template to obtain a native data dump; stores the native data dump in backup storage; and indexes the stored native data dump as a backup.

In one aspect, a method for providing backup services to applications in accordance with one or more embodiments of the invention includes identifying an application of the applications for providing the backup services; generating an application backup template based on a backup policy for the application; sending the generated application backup template to a production host that hosts the application; and making a determination that the backup policy has been triggered. The method further includes, in response to the determination, initiating a native data extraction from the application using the application backup template to obtain a native data dump; storing the native data dump in backup storage; and indexing the stored native data dump as a backup.

In one aspect, a non-transitory computer readable medium in accordance with one or more embodiments of the invention includes computer readable program code, which when executed by a computer processor enables the computer processor to perform a method for providing backup services to applications. The method includes identifying an application of the applications for providing the backup services; generating an application backup template based on a backup policy for the application; sending the generated application backup template to a production host that hosts the application; and making a determination that the backup policy has been triggered. The method further includes, in response to the determination, initiating a native data extraction from the application using the application backup template to obtain a native data dump; storing the native data dump in backup storage; and indexing the stored native data dump as a backup.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for providing backup and/or restoration services. More specifically, the systems, devices, and methods may provide backup and restoration services that do not rely on compatibility between the system and applications for which backup services are provided.

In one or more embodiments of the invention, the system orchestrates the storage of data from applications by invoking native data extraction functions of the applications. By doing so embodiments of the invention may provide an extensible system that is compatible with existing applications and future applications for backup and/or restoration purposes.

In one or more embodiments of the invention, when orchestrating storage of data from applications the system automatically mounts storage resources that are remote to the applications. By doing so, embodiments of the invention may enable applications to store data at locations specified by global data storage policies and thereby provide a system for backing up application data that is more efficient than contemporary methods. While the above advantages of embodiments of the invention have described, embodiments of the invention may provide other or different advantages without departing from the invention.

Figure 1:
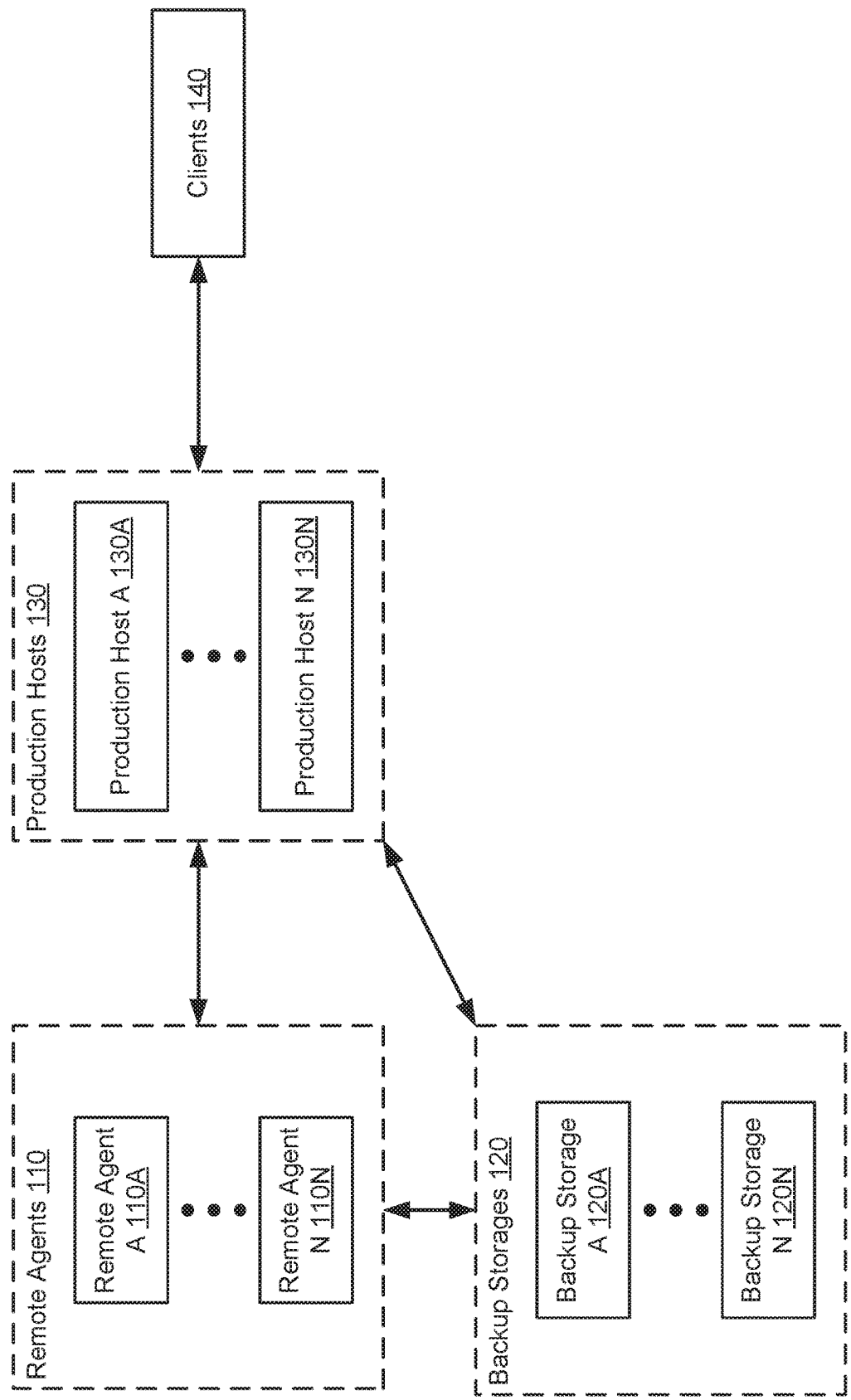
FIG. 1 shows a diagram of a system in accordance with one or more embodiments of the invention.

FIG. 1 shows an example system in accordance with one or more embodiments of the invention. The system may include production hosts (130) that applications exposed to clients (140). The system may further include remote agents (110) that provide services to the production hosts (130). The services may include data storage in backup storages (120) and restorations of applications using the data stored in the backup storages (120).

In one or more embodiments of the invention, the remote agents (110) may orchestrate the process of storing data from applications in the backup storages (120). The remote agents (110) may do so by invoke native application data extraction functionality of the applications that provides application data in a format native to each respective application. The remote agents (110) may orchestrate the application data extraction by setting a target storage location and managing conversion of the application data into a format that is usable for restoration purposes.

Each component of the system of FIG. 1 may be operably connected via any combination of wired and wireless connections. Each component of the system of FIG. 1 is discussed below.

The clients (140) may be computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application. The clients (140) may be other types of computing devices without departing from the invention. For additional details regarding computing devices, See FIG. 7.

The clients (140) may interact with applications hosted by the production hosts (130). For example, the applications may be databases, email servers, or any other type of application. The clients (140) may utilize services provided by these examples of applications or other application types hosted by the production hosts (130). By utilizing the services of the applications, data that is important to the clients (140) may be stored as part of application data for each respective application on the production hosts (130) or at other locations.

In one or more embodiments of the invention, the production hosts (130) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application. The production hosts (130) may be other types of computing devices without departing from the invention. For additional details regarding computing devices, See FIG. 7.

In one or more embodiments of the invention, the production hosts (130) are distributed computing devices. As used herein, a distributed computing device refers to functionality provided by a logical device that utilizes the computing resources of one or more separate and/or distinct computing devices. For example, in one or more embodiments of the invention, the production hosts (130) may be distributed devices that include components distributed across a number of separate and/or distinct computing devices. In such a scenario, the functionality of the production hosts (130) may be performed by multiple different computing devices without departing from the invention.

In one or more embodiments of the invention, the production hosts (130) host applications. The production hosts (130) may host any number of applications without departing from the invention. The production hosts (130) may also host agents, or other executing components, for orchestrating the operation of the hosted applications and for backup generation or restoration purposes. For additional details regarding the production hosts (130), See FIG. 2.

In one or more embodiments of the invention, the remote agents (110) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of remote agents (110) described in this application and all, or a portion thereof, of the methods illustrated in FIGS. 5A-5B. The remote agents (110) may be other types of computing devices without departing from the invention. For additional details regarding computing devices, See FIG. 7.

In one or more embodiments of the invention, the remote agents (110) are distributed computing devices. As used herein, a distributed computing device refers to functionality provided by a logical device that utilizes the computing resources of one or more separate and/or distinct computing devices. For example, in one or more embodiments of the invention, the remote agents (110) may be distributed devices that include components distributed across a number of separate and/or distinct computing devices. In such a scenario, the functionality of the remote agents (110) may be performed by multiple different computing devices without departing from the invention.

In one or more embodiments of the invention, the remote agents (110) provide services to the production hosts (130). The services may include storing of data and performing restoration. The data may be application data of applications hosted by the production hosts. After storing the data, the remote agent (110) may utilized the stored data to perform a restoration of the entity from which the data was obtained. For example, in a scenario in which the stored data is application from an application, the stored data may be used to restore the application to a state associated with the stored data. The state may be the state of the application at a point in time during which the data was stored in the backup storage.

In one or more embodiments of the invention, the remote agents (110) may store data by invoking native application data extraction functionality of applications. By doing so, data that is representative of a state of an application at a point in time may be extracted from the application data in a format that is native to the application. The remote agents (110) may orchestrate storage of the data in backup storage and index the data as part of a backup and recovery system. In one or more embodiments of the invention, the data may be deduplicated against other data stored in the backup storages and/or reformatted into a format that is native to the backup and recovery system when stored in the backup storage. By doing so, the remote agents (110) may provide a method for ensuring future compatibility with applications for backup and/or recovery systems. Thus, embodiments of the invention may provide an improved backup and/or recovery system that is extensible to ensure compatibility with any number of applications that currently exist and future applications. In contrast, current backup and/or recovery system may utilize a model that requires that backup and/or recovery system to be natively compatible with applications for which backup and/or recovery services will be provided. For additional details regarding the remote agents, See FIG. 2.

In one or more embodiments of the invention, the backup storages (120) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device that cause the computing device to provide the functionality of the backup storages (120) described through this application and all, or a portion, of the methods illustrated in FIG. 5A-5B. For additional details regarding computing devices, See FIG. 7.

In one or more embodiments of the invention, the backup storages (120) are distributed computing devices. As used herein, a distributed computing device refers to functionality provided by a logical device that utilizes the computing resources of one or more separate and/or distinct computing devices. For example, in one or more embodiments of the invention, the backup storages (120) may be distributed devices that include components distributed across a number of separate and/or distinct computing devices. In such a scenario, the functionality of the backup storages (120) may be performed by multiple different computing devices without departing from the invention.

In one or more embodiments of the invention, the backup storages (120) store data from the production hosts (130). The data may be, for example, application data. Any quantity of application data may be stored in the backup storages (120) without departing from the invention. The application data may be associated with respective applications from which the application data was obtained.

In one or more embodiments of the invention, the backup storages (120) may provide storage resources to the production hosts (130). For example, the backup storages (120) may enable a portion of their storages resources to be mounted by the production hosts (130). By doing so, applications executing on the production hosts (130) may store data directly in the backup storages (120).

In one or more embodiments of the invention, the backup storages (120) may deduplicate the application data against existing data stored in the backup storages. By deduplicating the application data, the quantity of data that it can stored in the backup storages may be increased when compared to storing the application without deduplication. To deduplicate the application, the backup storages (120) may only storing copies of unique portions of the application data. When storing the application data, the application data may first be checked to determine whether it is duplicative of data already stored in the backup storage. Only the unique portions of the application data may be stored in the backup storage. Storing and accessing deduplicated application data may be significantly more computing resource costly than storing application data that is not deduplicated.

In one or more embodiments of the invention, storing the application data in the backup storages (120) reformats the application data into a format that is native to the backups storages (120). For example, the application data may be stored in a containerized format and/or deduplicated. By doing so, the efficiency of storing the application data may be improved. For example, storing the application data in a containerized format may decrease the storage overhead required for storing the application data, e.g., less metadata is required for storage of the application data. Similarly, deduplicating the application data may reduce the total quantity bits stored while still enabling the application data to be retrieved, e.g., regenerated using a data structure that lists the unique portions of data in the backup storages (120) and an order for recombination to obtain the application data.

Figure 2:
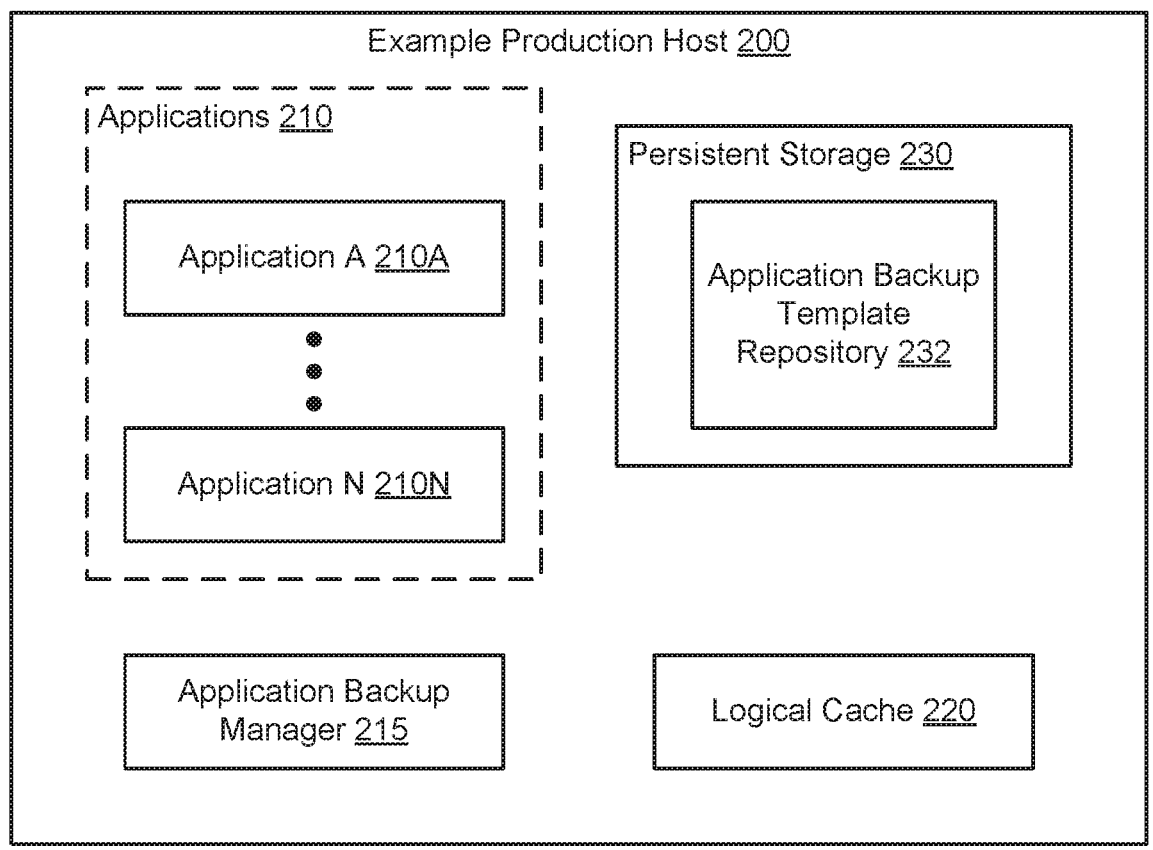
FIG. 2 shows a diagram of an example production host in accordance with one or more embodiments of the invention.

As discussed above, the backup storages may store data obtained from the production hosts (130). FIG. 2 shows a diagram of an example production host (200) in accordance with one or more embodiments of the invention.

In one or more embodiments of the invention, the example production host (200) hosts applications (210). The applications (210) may be, for example, databases, email applications, communication utilities, etc. The example production hosts (200) may host any number of applications (210A, 210N) without departing from the invention.

In one or more embodiments of the invention, one or more of the applications (210) includes a native data extraction function. The native data extraction function may extract a copy of application data that reflects a state of the application at the time of performing the native data extraction.

In one or more embodiments of the invention, native data extraction function is partially configurable. For example, the native data extraction function may enable another entity to set a storage location for the application and/or a quantity of data to be included in the application data. In this manner, both a storage location for the application data and a portion of the data of the application may be set.

In one or more embodiments of the invention, the native data extraction function is partially configurable via an application backup template. An application backup template may be data structure that includes parameters for configuring the partially configurable native data extraction function. In one or more embodiments of the invention, the application backup template is stored in XML format.

In one or more embodiments of the invention, the example production host (200) includes an application backup manager (215). The application backup manager (215) may generate application backup templates and invoke the native data extraction functions of the applications (200). The application backup manager (215) may perform these functions based on commands received from a remote agent. For example, the remote agent may provide parameters for application backup templates and specify when native data extraction functions are to be invoked.

In one or more embodiments of the invention, the application backup manager (215) mounts storage resources of backup storages. Mounting storage resources of backup storages may make the storage resources natively accessible to applications executing on a production host that hosts the application backup manager (215). The application backup manager (215) may automatically mount storage resources of a backup storage, or another entity, when parameters received from a remote agent indicate that application data is to be saved directly in the backup storage, or another entity.

In one or more embodiments of the invention, the application backup manager (215) is a hardware device including circuitry. The application backup manager (215) may be, for example, a digital signal processor, a field programmable gate array, or an application specific integrated circuit. The application backup manager (215) may be other types of hardware devices without departing from the invention.

In one or more embodiments of the invention, the application backup manager (215) is implemented as computing code stored on a persistent storage that when executed by a processor performs the functionality of the application backup manager (215). The processor may be a hardware processor including circuitry such as, for example, a central processing unit or a microcontroller. The processor may be other types of hardware devices for processing digital information without departing from the invention.

In one or more embodiments of the invention, the example production host (200) includes a logical cache (220). The logical cache (220) may utilizes computing resources of the example production host (200) to provide caching services to the applications (210) or other entities executing on the example production host (200).

In one or more embodiments of the invention, the logical cache (220) provides caching services to the applications (210) when the applications (210) are attempting to store application data in a backup storage. For example, the applications (210) attempt to store data in the backup storage via the mounted storage resources, the data stream may be diverted to the logical cache (220) for temporary storage. As application data is streamed to the logical cache (220), the application data may be stored until a predetermined quantity is stored in the logical cache (220). Once the predetermined quantity is stored, the contents of the logical cache (220) may be sent to the backup storage for storage. Doing so may improve the efficiency of storing data in the backup storage. The backup storage may have a preferred quantity of data for data storage. For example, repeated storages of small quantities of data may be computationally inefficient due to the deduplication applied to the application data. Thus, embodiments of the invention may provide a more efficient method of storing data in backup storage.

In one or more embodiments of the invention, the persistent storage (230) is a storage device that stores data structures. The persistent storage (230) may be a physical or logical device. For example, the persistent storage (230) may include solid state drives, hard disk drives, tape drives, and other components to provide data storage functionality. Alternatively, the persistent storage (230) may be a logical device that utilizes the physical computing resources of other components to provide data storage functionality.

In one or more embodiments of the invention, the persistent storage (230) stores an application backup template repository (232). The application backup template repository (232) may store application backup templates generated by the application backup manager (215), or other entities. Each of the application backup templates may be associated with one or more applications of the applications (210).

Figure 3:
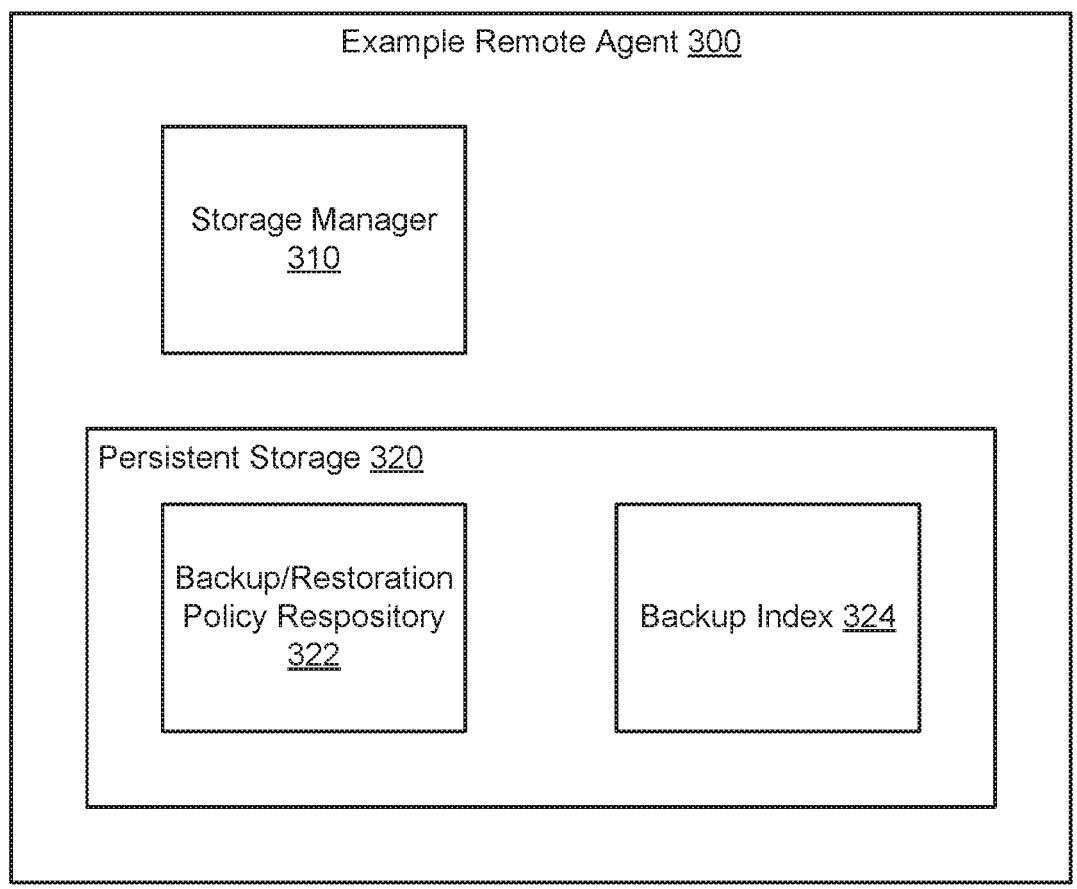
FIG. 3 shows a diagram of an example remote agent in accordance with one or more embodiments of the invention.

As discussed above, the remote agents may store data obtained from the production hosts in backups storages. FIG. 3 shows a diagram of an example remote agent (200) in accordance with one or more embodiments of the invention.

In one or more embodiments of the invention, the example remote agent (300) orchestrates the storage of application data in backup storage. The remote agent (300) may perform workflows for storing the application data. The workflows may be specified by policies stored in a backup/restoration policy repository (322). For additional details regarding policies and workflows, See FIG. 4. To provide the aforementioned functionality, the example remote agent (300) may include a storage manager (310) and a persistent storage (320). Each component of the example remote agent (300) is discussed below.

In one or more embodiments of the invention, the storage manager (310) performs workflows based on policies stored in the backup/restoration policy repository (322). The workflows may include sending command to other components of the system of FIG. 1. For example, performing the workflows may cause the storage manager (310) to send application data storage commands to production hosts.

In one or more embodiments of the invention, the storage manager (310) may perform workflows specified by the policies when respective policies are triggered. As will be discussed below, performance of a workflow specified by a policy may be conditional on the occurrence of an event such as, for example, the occurrence of a predetermined point in time. For additional details regarding policies, See FIG. 4.

In one or more embodiments of the invention, the storage manager (310) is a hardware device including circuitry. The storage manager (310) may be, for example, a digital signal processor, a field programmable gate array, or an application specific integrated circuit. The storage manager (310) may be other types of hardware devices without departing from the invention.

In one or more embodiments of the invention, the storage manager (310) is implemented as computing code stored on a persistent storage that when executed by a processor performs the functionality of the storage manager (310). The processor may be a hardware processor including circuitry such as, for example, a central processing unit or a microcontroller. The processor may be other types of hardware devices for processing digital information without departing from the invention.

In one or more embodiments of the invention, the persistent storage (320) is a storage device that stores data structures. The persistent storage (320) may be a physical or logical device. For example, the persistent storage (320) may include solid state drives, hard disk drives, tape drives, and other components to provide data storage functionality. Alternatively, the persistent storage (320) may be a logical device that utilizes the physical computing resources of other components to provide data storage functionality.

In one or more embodiments of the invention, the persistent storage (320) stores a backup/restoration policy repository (322). The backup/restoration policy repository (322) may store policies. The policies may specify workflows for generating backups of applications hosted by the production hosts, or other entities, and/or specify workflows for restoring applications hosted by the production hosts, or other entities. For additional details regarding policies, See FIG. 4.

In one or more embodiments of the invention, the persistent storage (320) stores a backup index (324). The backup index (324) may reflect data stored in the backup storages that is usable for restoration purposes. The backup index (324) may also include metadata regarding the data stored in the backup storages. When the storage manager (310) performs a backup generation workflow, the storage manager (310) may update the backup index (324) to reflect the newly stored data such as application data from an application hosted by a production host. By doing so, embodiments of the invention may provide a framework for performing restorations using application data. When performing a restoration, the storage manager (310) may use application data stored in a production host, in combination with or separately from other types of backups, to restore an application to a previous state. The other types of backups may be, for example, a machine image of a production host or another entity or a differencing disk that reflects changes to a portion of the production host rather than a state of the portion of the production host at a particular point in time.

In one or more embodiments of the invention, the production hosts may host virtual machines that host applications. In such a scenario, backups of the virtual machines and application data may be used in combination to restore an application and/or virtual machine to a desired previous state. Similarly, differencing disks may also be used in combination with the aforementioned types of backups for restoration purposes.

Figure 4:
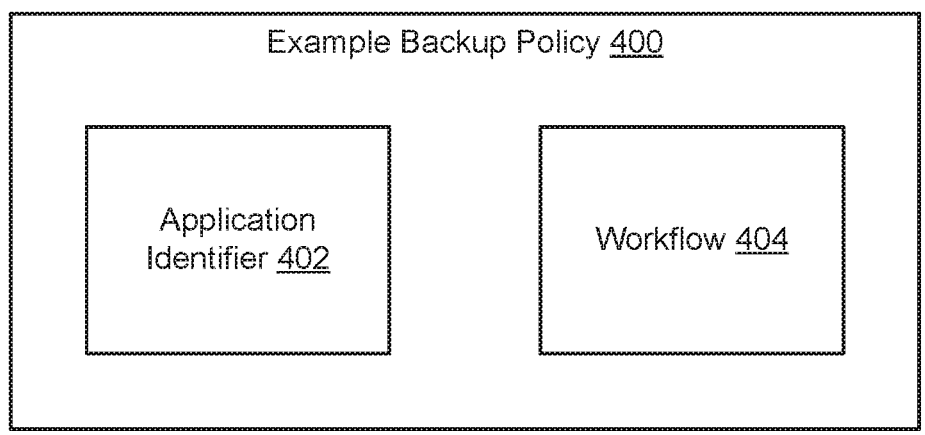
FIG. 4 shows a diagram of an example backup policy in accordance with one or more embodiments of the invention.

To further clarify embodiments of the invention, a diagram of an example backup policy (400) in accordance with one or more embodiments of the invention is shown in FIG. 4. As noted above, backup policies may specify workflows for generating a backup of an application hosted by a production host, or other entity.

In one or more embodiments of the invention, the example backup policy (400) includes an application identifier (402). The application identifier (402) may identify the application to which the policy applies.

In one or more embodiments of the invention, the example backup policy (400) includes a workflow (404). The workflow may specify the series of actions to be performed to generate a backup of an application. The workflow may also specify triggering conditions upon the occurrence of which the workflow is to be performed. The triggering conditions may be, for example, the occurrence of a point in time or multiple points in time. Other triggering conditions may be used without departing from the invention.

In one or more embodiments of the invention, the series of actions specify where the application data is to be stored. In one or more embodiments of the invention, the location is a backup storage. In such a scenario, the production host hosting the application specified by the application identifier (402) may mount storage resources of the production host to enable the application identified by the application identifier (402) to store data directly, natively, in the backup storage.

In one or more embodiments of the invention, the series of actions specify a level of storage redundancy, e.g., number of copies of data stored in multiple backup storages. The series of actions may specify other characteristics of the workflow without (404) without departing from the invention.

Figure 5A:
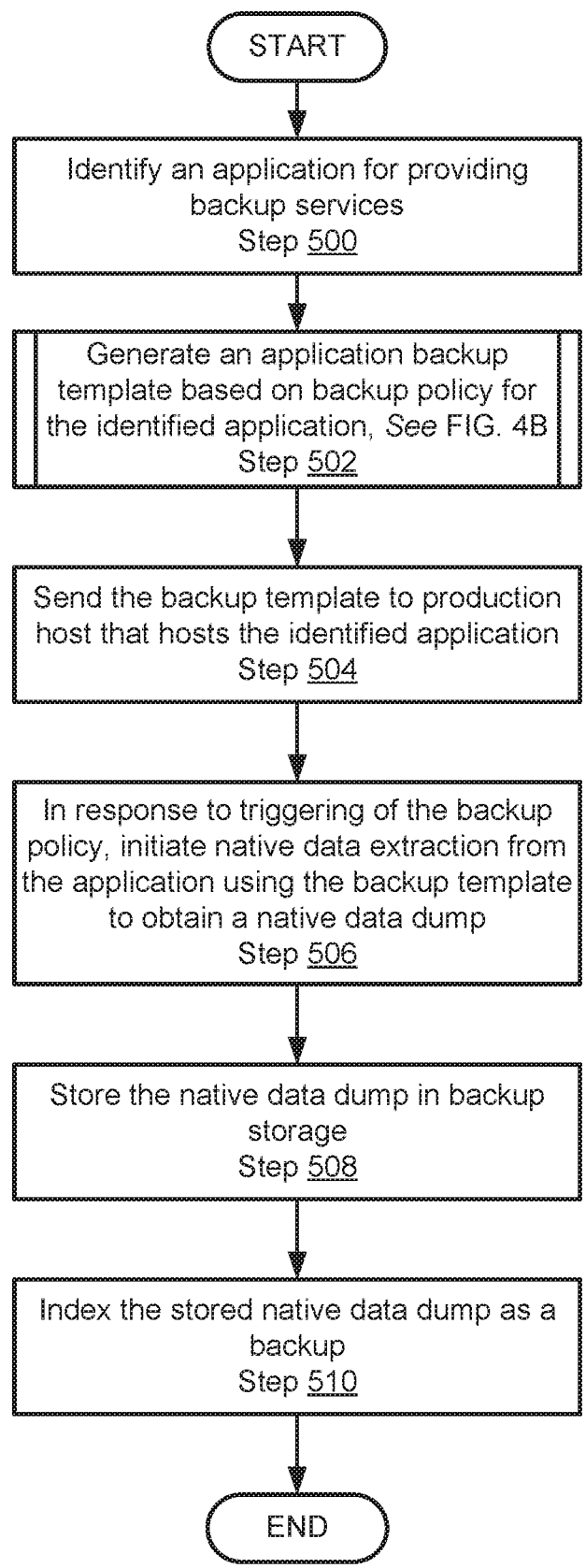
FIG. 5A shows a flowchart of a method of generating a backup in accordance with one or more embodiments of the invention.
Figure 5B:
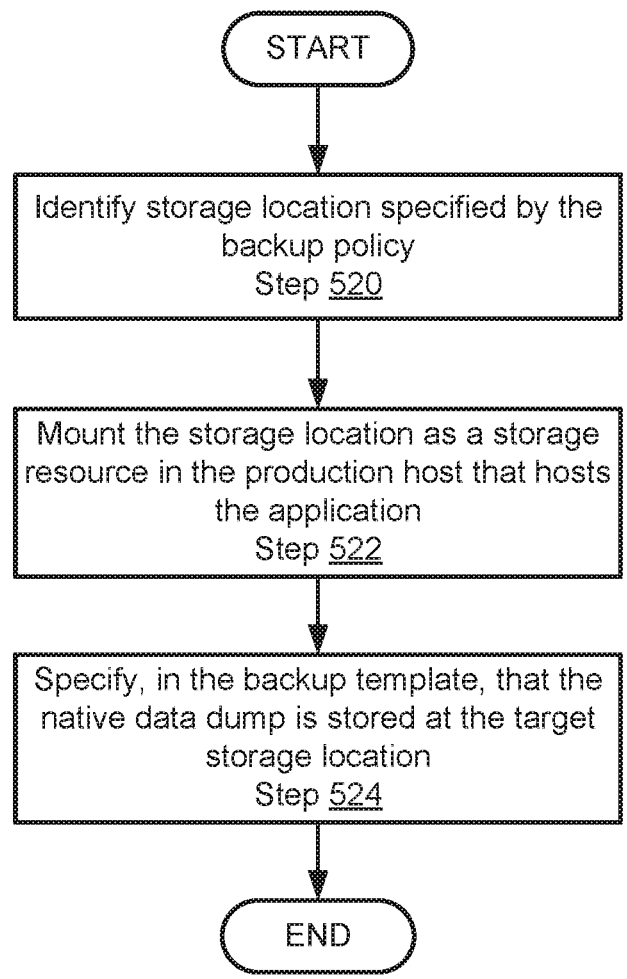
FIG. 5B shows a flowchart of a method of generating an application backup template in accordance with one or more embodiments of the invention.

As discussed above, components of the system of FIG. 1 may perform methods of generating backups and performing restorations of applications, in addition to other functions. FIGS. 5A-5B show methods in accordance with one or more embodiments of the invention that may be performed by components of the system of FIG. 1.

FIG. 5A shows a flowchart of a method in accordance with one or more embodiments of the invention. The method depicted in FIG. 5A may be used to generate a backup of an application in accordance with one or more embodiments of the invention. The method shown in FIG. 5A may be performed by, for example, remote agents (e.g., 110, FIG. 1). Other components of the system illustrated in FIG. 1 may perform the method of FIG. 5A without departing from the invention.

In Step 500, an application is identified for providing backup purposes.

In one or more embodiments of the invention, the application is hosted by a production host that hosts one or more applications.

In one or more embodiments of the invention, the application is identified based on a policy that is in a triggered state. When a policy is in a triggered state, a workflow specified by the policy may be performed. The policy may specify the application.

In Step 502, an application backup template is generated based on the backup policy for the identified application.

As noted above, the backup policy may specify a backup workflow. The workflow may include where application data is to be stored, among other characteristics. The application backup template may be generated to include parameters of the workflow to ensure that the application performs action in compliance with the workflow. In this manner, embodiments of the invention may provide an orchestrated workflow that is extensible to any number of applications. For example, the application backup template may be configured to include any number of parameters that when executed by a production host cause the application to invoke a native application extraction function. Thus, embodiments of the invention may ensure future compatibility with applications for backup and/or restoration purposes.

In one or more embodiments of the invention, the backup template is generated via the method illustrated in FIG. 4B. The backup template may be generated via other methods without departing from the invention.

In Step 504, the backup template is sent to a production host that hosts the identified application.

In one or more embodiments of the invention, the backup template is stored by the production host in a repository. An application backup manager (e.g., 215, FIG. 2) may store the application backup template and take action based on the parameters included in the application backup template.

In one or more embodiments of the invention, the backup template is originally-stored in the production host. Thus, in some embodiments of the invention Step 504 may be omitted and Step 502 may be performed on a production host. In one or more embodiments of the invention, the backup template is both generated in the production host and stored in the production host, e.g., may not be generated in a remote agent or other entity before storage in a production host. For example, a user such as a system administrator may generate the backup template in the production host. In another example, a remote user may of another computing device may generate the backup template and store the generated backup template directly on the production host via a shared storage arrangement between the production host and the another computing device utilized by the remote user.

In one or more embodiments of the invention, the backup template may be stored remotely from a production host. For example, the backup template may be stored in a repository on another computing device. The backup template may be accessible by the production host hosting the application identified in Step 500.

In Step 506, in response to a triggering of the backup policy, a native data extraction from the application is initiated using the backup template to obtain a native data dump.

In one or more embodiments of the invention, the backup template configures the native data exaction function of the application to store data at a predetermined location. If the predetermined location is remote from the production host, storage resources of the remote entity may be mounted to enable the application to natively store the data in the remote entity.

In one or more embodiments of the invention, the native data dump includes application data in a format that is native to the application. In one or more embodiments of the invention, the application is not in a format native to a backup storage.

In Step 508, the native data dump is stored in backup storage.

In one or more embodiments of the invention, the native data dump is stored in backup storage by the native data extraction function automatically storing the application data in the backup storage. In other words, stored using mounted storage resources of the backup storage. In this manner, embodiments of the invention may provide a method for automatically storing backup data in backup storage that is remote from an entity hosting an application that is being backed up without storing the backup data locally. Doing so may improve the efficiency of backing applications by reducing the number of time the application data is stored.

In one or more embodiments of the invention, the application data may be cached in a logical cache of a production host before storage in a backup storage. For example, as the native data extraction function of an application streams data for storage in the mounted storage resources of the backup storage, it may be redirected to the logical cache. Portions of the application data of a predetermined size may be sent to the backup storage from the logical cache in discrete chunks. By doing so, deduplication and storage optimized sized chunks of data may be stored. Doing so may improve the efficiency of storing data in backup storage.

In one or more embodiments of the invention, the application data is stored locally on a storage of the production host. The application data may be transferred to backup storage after storage in the production host. For example, in a scenario in which the production host has intermittent connectivity with a backup storage, the application data may be stored locally and then transferred to the backup storage at a later point in time.

In Step 510, the stored native data dump is indexed as a backup.

In one or more embodiments of the invention, the stored native data dump, e.g., application data in the backup storage, is indexed by storing an identifier in an index of all of the backups in backup storage. The indexing the stored native data dump may make the stored native data dump usable for restoration purposes.

The method may end following Step 510.

FIG. 5B shows a flowchart of a method in accordance with one or more embodiments of the invention. The method depicted in FIG. 5B may be used to generate an application backup template of an application in accordance with one or more embodiments of the invention. The method shown in FIG. 5B may be performed by, for example, remote agents (e.g., 110, FIG. 1). Other components of the system illustrated in FIG. 1 may perform the method of FIG. 5B without departing from the invention.

In Step 520, a storage location specified by the backup policy is identified.

In one or more embodiments of the invention, the storage location is a backup storage.

In Step 522, the storage location is mounted as a storage resource in the production host that hosts the application.

In one or more embodiments of the invention, the storage location is mounted by providing native access to the storage location for data storage and access purposes. By mounting the storage location, applications executing on the production hosts may natively store data in the storage location. In a scenario in which the storage location is a backup storage, the application may directly write application data to the backup storage. By doing so, the application data does not need to be written locally before transfer to backup storage.

In Step 524, the application backup template is modified to specify that the native data dump is stored at the target storage location. In other words, modified to indicate a location for storage of application data when a native data extraction function of an application is invoked. By doing so, an application may read the application backup template and be configured to store application data at a desired location.

The method may end following Step 524.

While the methods illustrated in FIGS. 5A-5B have been illustrated as a series of steps, the steps may be performed in a different order, steps may be omitted, and any number of steps may be performed in parallel or overlapping manner without departing from the invention.

Figure 6A:
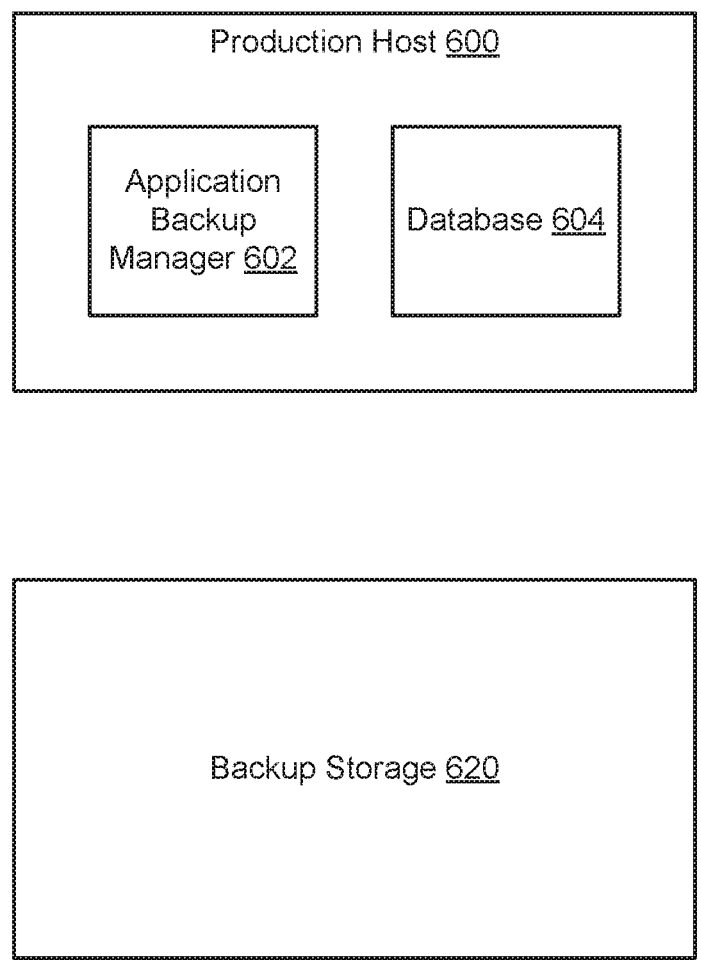
FIG. 6A shows a diagram of an example system at a first point in time.
Figure 6B:
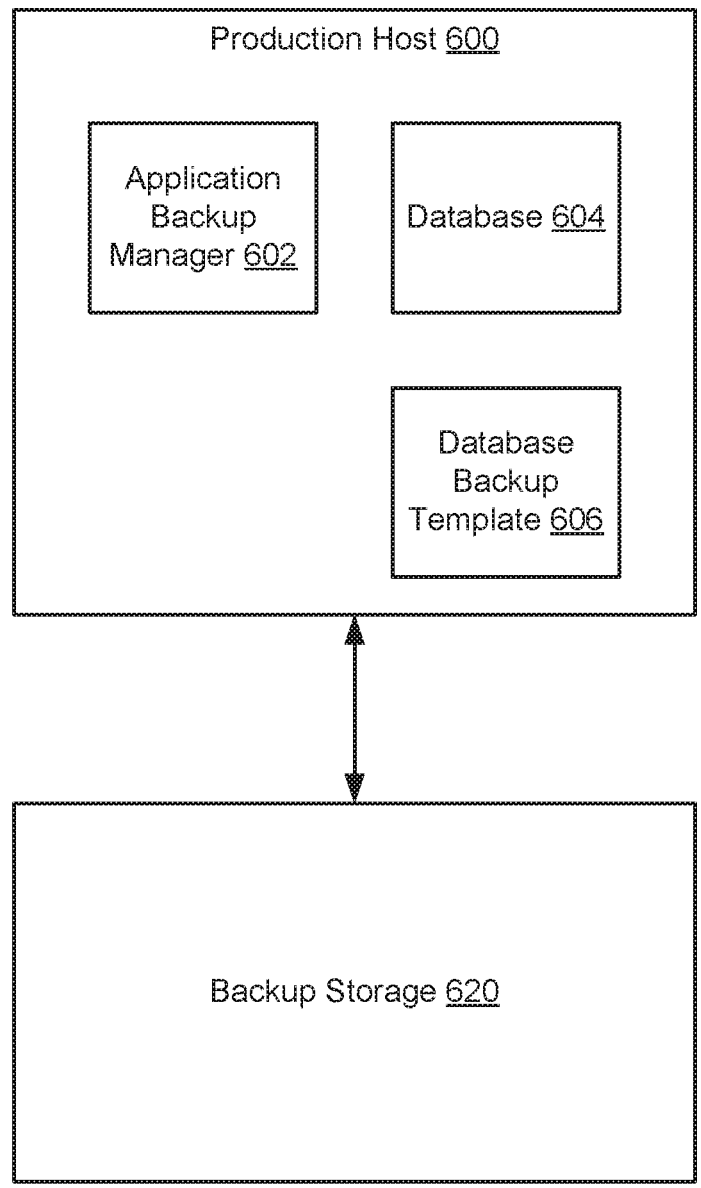
FIG. 6B shows a diagram of the example system of FIG. 6A at a second point in time.
Figure 6C:
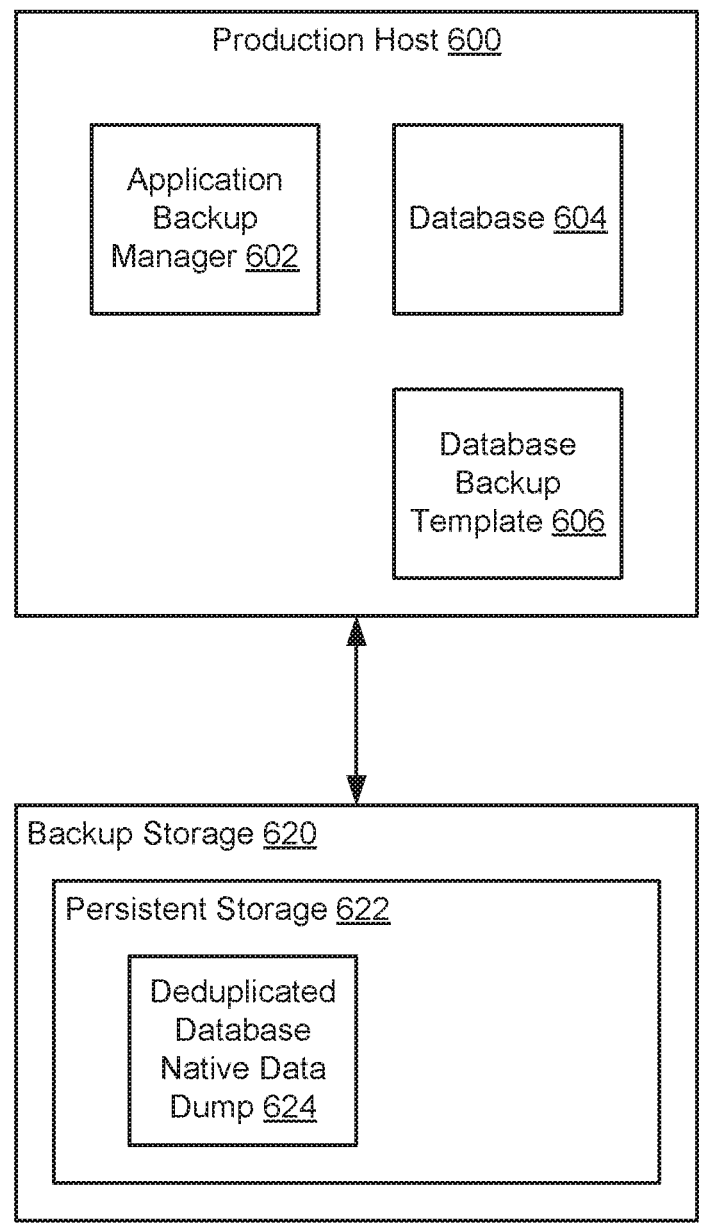
FIG. 6C shows a diagram of the example system of FIG. 6A at a third point in time.

To further clarify embodiments of the invention, a non-limiting example is provided in FIGS. 6A-6C. The system illustrated in FIGS. 6A-6C may be similar to that of FIG. 1 but for the sake of brevity only a portion of the components are illustrated.

EXAMPLE

Consider a scenario in which a production host (600) is hosting a database (604) as illustrated in FIG. 6A. For data integrity purposes, it may be desirable to store backup data for the database (604) in a backup storage (620). To store the backup data, a remote agent (not shown) may perform the methods illustrated in FIG. 5A-5B. A policy associated with the application, e.g., includes an identifier of the database (604), may specify that application data is to be stored in the backup storage (620).

Based on the policy, the remote agent generates a database backup template (606) that configures the native data extraction function of the database (604) to store its application data in the backup storage (620) as illustrated in FIG. 6B. FIG. 6B shows a diagram of the system of FIG. 6A after the database backup template (606) is stored in the production host (600). To ensure that the database (604) has access to the storage location specified by the policy, an application backup manager (604) mounts storage resources of the backup storage (620).

After performing the aforementioned steps, the remote agent waits until policy associated with the database (604) is triggered. Once triggered, the remote agent instructs the application backup manager (602) to generate a backup of the database (604). In response to receiving the instruction, the application backup manager (602) invokes the native data extraction function of the database (604) which is performed by the database (604) in accordance with the database backup template (606).

In response to having its native data extraction function invoked, the database (604) generates application data, e.g., a native data dump, and stores the application data in a persistent storage (622) of the backup storage (620) via the mounted storage resources. The backup storage (620) deduplicates the application data and stores deduplicated database native data dump (624) as illustrated in FIG. 6C. FIG. 6C shows a diagram of the system of FIG. 6B after the database native data dump is both deduplicated and stored in the backup storage (620).

Once the deduplicated database native data dump (624), the remote agent indexes the deduplicated database native data dump (624) thereby preparing it for future restoration use. In this manner, the example system may improve the data integrity of the database (604) and other applications by storing the application data in a remote, backup storage (620).

End of Example

Figure 7:
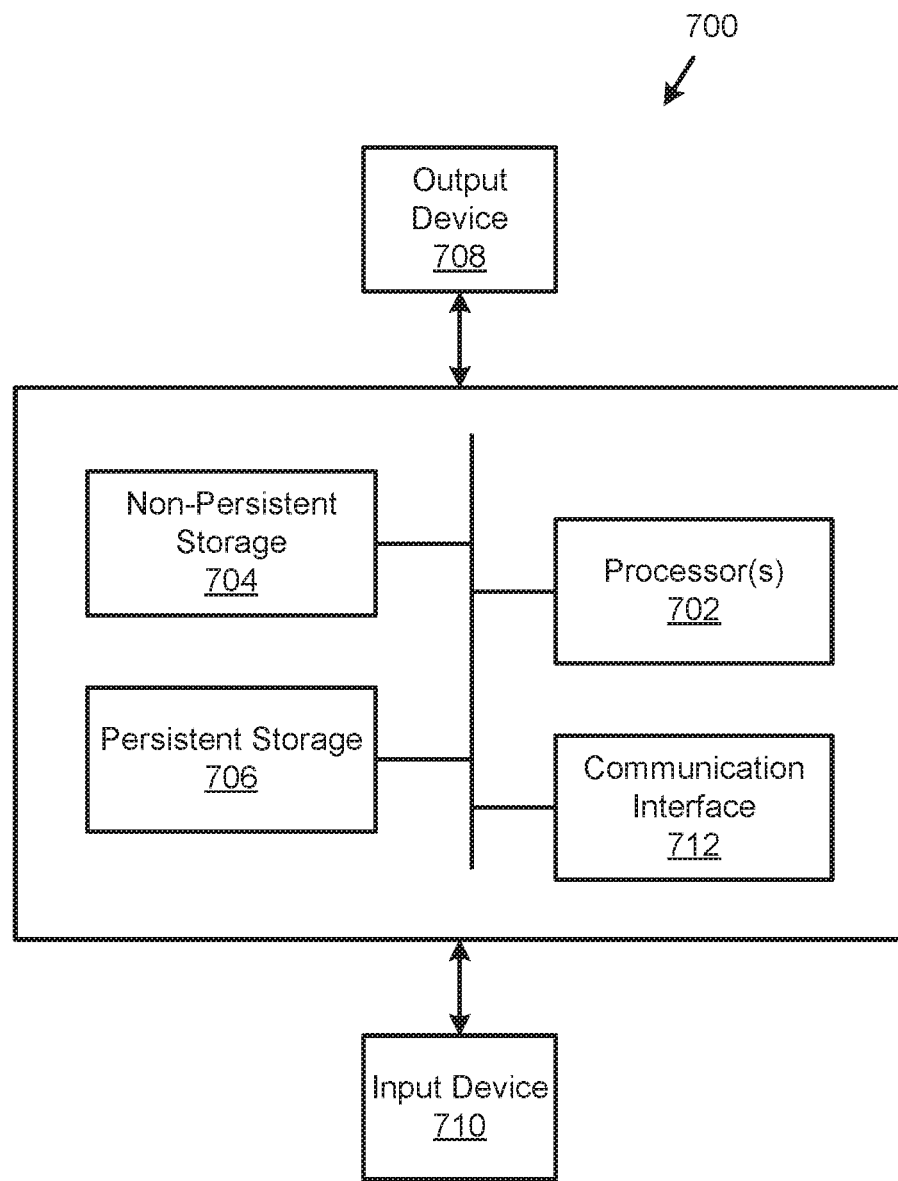
FIG. 7 shows a diagram of a computing device in accordance with one or more embodiments of the invention.

As discussed above, embodiments of the invention may be implemented using computing devices. FIG. 7 shows a diagram of a computing device in accordance with one or more embodiments of the invention. The computing device (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one embodiment of the invention, the computer processor(s) (702) may be an integrated circuit for processing instructions. For example, the computer processor(s) may be one or more cores or micro-cores of a processor. The computing device (700) may also include one or more input devices (710), such as a touchscreen, keyboard, mouse, microphone, touchpad, electronic pen, or any other type of input device. Further, the communication interface (712) may include an integrated circuit for connecting the computing device (700) to a network (not shown) (e.g., a local area network (LAN), a wide area network (WAN) such as the Internet, mobile network, or any other type of network) and/or to another device, such as another computing device.

In one embodiment of the invention, the computing device (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve methods for backing up data in a distributed system. In contrast to prior system, embodiments of the invention may provide an extensible system for backup. Rather than relying on compatibility with applications for backup purposes which is both time consuming and costly to implement, embodiments of the invention may provide an extensible system that relies on native data extraction functions of applications. By doing so, embodiments of the invention may provide a data backup system that is compatible with existing and future applications. Thus, embodiments of the invention may provide an improved distributed system that reduces the cost of providing data backup functionality by eliminating the need for compatibility with applications for backup purposes.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A remote agent for providing backup services to applications, comprising:
   a persistent storage that stores backup policies for the applications; and
   a backup manager programmed to:
      identify an application of the applications for providing the backup services, wherein the application implements a native data extraction function;
      generate an application backup template based on a backup policy of the backup policies for the application, wherein the application backup template specifies a configuration parameter for the native data extraction function;
      send the generated application backup template to a production host that hosts the application;
      make a determination that the backup policy has been triggered;
      in response to the determination:
         initiate a native data extraction from the application using the application backup template to obtain a native data dump,
            wherein initiating the native data extraction comprises invoking the native data extraction function in the application using the configuration parameter,
            wherein the application, upon executing the native data extraction function, generates the native data dump, and
            wherein the native data dump comprises a copy of application data that reflects a state of the application at a time of the native data extraction;
         store the native data dump in backup storage; and
         index the stored native data dump as a backup.

2. The remote agent of claim 1, wherein generating the application backup template based on the backup policy for the backup policies for the application comprises:

identifying a storage location specified by the backup policy;

mounting the storage location as a storage resource in the production host that hosts the application; and specifying, in the configuration parameter in the application backup template, that the native data dump is stored at the storage location.

3. The remote agent of claim 2, wherein the storage location is the backup storage.

4. The remote agent of claim 1, wherein storing the native data dump in the backup storage deduplicates the native data dump against other data in the backup storage.

5. The remote agent of claim 1, wherein the native data dump is in a first format native to the application.

6. The remote agent of claim 5, wherein storing the native data dump in the backup storage reformats the native data dump to a second format that is not native to the application.

7. The remote agent of claim 1, wherein the obtained native data dump is stored remotely from the production host before the native data dump is stored in backup storage.

8. The remote agent of claim 1, wherein indexing the stored native data dump makes the backup available for restoration purposes.

9. A method for providing backup services to applications, comprising:

identifying an application of the applications for providing the backup services, wherein the application implements a native data extraction function;

generating an application backup template based on a backup policy for the application, wherein the application backup template specifies a configuration parameter for the native data extraction function;

sending the generated application backup template to a production host that hosts the application;

making a determination that the backup policy has been triggered;

in response to the determination:

initiating a native data extraction from the application using the application backup template to obtain a native data dump, wherein initiating the native data extraction comprises invoking the native data extraction function in the application using the configuration parameter, wherein the application, upon executing the native data extraction function, generates the native data dump, and wherein the native data dump comprises a copy of application data that reflects a state of the application at a time of the native data extraction;

storing the native data dump in backup storage; and indexing the stored native data dump as a backup.

10. The method of claim 9, wherein generating the application backup template based on the backup policy for the backup policies for the application comprises:

identifying a storage location specified by the backup policy;

mounting the storage location as a storage resource in the production host that hosts the application; and specifying, in the configuration parameter in the application backup template, that the native data dump is stored at the storage location.

11. The method of claim 10, wherein the storage location is the backup storage.

12. The method of claim 9, wherein the native data dump is in a first format native to the application, wherein storing the native data dump in the backup storage reformats the native data dump to a second format that is not native to the application.

13. A non-transitory computer readable medium comprising computer readable program code, which when executed by a computer processor enables the computer processor to perform a method for providing backup services to applications, the method comprising:

identifying an application of the applications for providing the backup services, wherein the application implements a native data extraction function;

generating an application backup template based on a backup policy for the application, wherein the application backup template specifies a configuration parameter for the native data extraction function;

sending the generated application backup template to a production host that hosts the application;

making a determination that the backup policy has been triggered;

in response to the determination:

initiating a native data extraction from the application using the application backup template to obtain a native data dump, wherein initiating the native data extraction comprises invoking the native data extraction function in the application using the configuration parameter, wherein the application, upon executing the native data extraction function, generates the native data dump, and wherein the native data dump comprises a copy of application data that reflects a state of the application at a time of the native data extraction;

storing the native data dump in backup storage; and indexing the stored native data dump as a backup.

14. The non-transitory computer readable medium of claim 13, wherein generating the application backup template based on the backup policy for the backup policies for the application comprises:

identifying a storage location specified by the backup policy;

mounting the storage location as a storage resource in the production host that hosts the application; and specifying, in the configuration parameter in the application backup template, that the native data dump is stored at the storage location.

15. The non-transitory computer readable medium of claim 14, wherein the storage location is the backup storage.

16. The non-transitory computer readable medium of claim 13, wherein the native data dump is in a first format native to the application, wherein storing the native data dump in the backup storage reformats the native data dump to a second format that is not native to the application.

* * * * *